2,782,209
Patented Feb. 19, 1957

2,782,209
DIANTHRONE ETHYLENE DERIVATIVES CONTAINING BROMINE AND PROCESS OF MAKING SAME

Emil Schwamberger, Frankfurt am Main-Fechenheim, Germany, assignor to Cassella Farbwerke Mainkur Aktiengesellschaft, Frankfurt am Main-Fechenheim, Germany, a company of Germany No Drawing. Application January 13, 1953,
Serial No. 331,099

Claims priority, application Germany January 16, 1952

4 Claims. (Cl. 260—351)

This invention relates to compounds obtained from the reaction products of anthrones and glyoxal by the action of alkaline condensing agents, which reaction products are said to have a "dianthrone ethylene" structure. More particularly, the invention relates to dianthrone ethylene derivatives containing bromine and to a process of making same.

The red to violet colored vat dyestuffs obtained according to U. S. Patent No. 1,709,956 from the reaction products of anthrones with glyoxal by the action of alkaline condensing agents are said to have a molecular structure of "dianthrone ethylenes" according to the following formula:

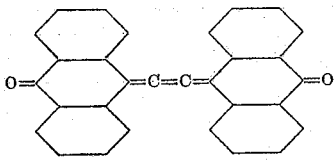

I have found that by incorporating bromine into these red to violet dyestuffs new compounds are obtained having properties which are substantially different from those expected by conclusions drawn in analogy. The new compounds obtained according to the present invention, which may have the form of uniform blue crystals, dissolve in a hydrosulfite vat with a green color, but have almost no fibre affinity. The "dianthrone ethylenes," however, give red-violet colored vats and have a great fibre affinity. The incorporation of bromine into the anthraquinone nuclei is normally accompanied by a shift toward blue-violet of the shades obtained on dyeing. Also such dianthrone ethylenes containing bromine may be obtained as by-products when using the present procedure. The molecular constitution of the blue colored compounds obtained as the main products is not yet clear.

It is an object of this invention to provide blue compounds containing bromine in amounts usually corresponding to 2 or 4 atoms of bromine in each molecule, depending upon whether or not the anthraquinone nucleus contains further substituents. Partly, the bromine may be bonded very loosely. They are not suited for use as vat dyestuffs because of their low fibre affinity. When rubbed in oil, they furnish covered dark-blue prints.

The new compounds may be used particularly as intermediates for the synthesis of vat dyestuffs. By a treatment with e. g. acidic condensing agents such as concentrated sulfuric acid or aluminum chloride, or simply by heating them for a short time in solvents boiling at high temperatures, e. g. nitrobenzene, they may be converted into compounds of the acedianthrone series, one portion of the incorporated bromine being maintained.

The production of the new blue compounds by incorporating bromine into dianthrone ethylene or its substitution products (e. g. halogen dianthrone ethylenes) is advantageously accomplished by the action of bromine in strong acids such as chlorosulfonic acid or sulfuric acid monohydrate.

It is of advantage, but not absolutely necessary, to work with a halogen carrier, e. g. in the presence of iodine or a sulfur halide. The crude products obtained by pouring the reaction mass on ice may be purified by recrystallizing from organic solvents the boiling points of which are not too high, e. g. chlorobenzene or o-dichlorobenzene. The color of solution in organic solvents is blue, in concentrated sulfuric acid brown-olive.

The following examples are given for the purpose of illustrating the invention, the parts being by weight and the temperatures in degrees centigrade.

Example 1

In 80 parts of chlorosulfonic acid, 0.5 part of iodine and 5 parts of the dianthrone ethylene obtainable according to U. S. Patent 1,709,956, Example 1, are dissolved. Then 6.3 parts of bromine are added by dropping in during about 10 minutes and stirred at about 30° for about 2 to 3 hours. After pouring on ice, a dark-blue precipitate is obtained which is filtered by suction and washed with water and hot alcohol. The blue substance obtained is boiled up for a short time in 300 parts of o-dichlorobenzene, the solution is then filtered and allowed to cool. The precipitating amounts of substances consisting of brown and violet colored amorphous flocks are by-products. Having been filtered once more, the solution exhibits a pure blue color and, after adding 30 parts of petrol ether, it is allowed to stand for about 24 hours, the new substance crystallizing out as uniform blue needles. The product thus obtained contains 44–45% of bromine, which amount corresponds to 4 atoms of bromine on the basis of the dianthrone ethylene molecule. The color of solution of the substance in concentrated sulfuric acid is brown-olive, the solution in a hydrosulfite vat is green.

When heating a sample of this substance in nitrobenzene to 200–208° for some minutes, dark red-brown crystals precipitate which dissolve in concentrated sulfuric acid with a reddish blue color and dye cotton from a yellow-brown vat reddish-brown shades. The product obtained is a dyestuff of the acedianthrone series which still contains bromine and may serve itself as a starting material for other dyestuffs.

When in this example dimethyldianthrone-ethylene obtainable from 2-methylanthrone is used instead of the dianthrone-ethylene, likewise a blue substance containing bromine is obtained.

Example 2

In 80 parts of chlorosulfonic acid, 0.5 part of iodine and 5 parts of the 2.2'-dichlorodianthrone-ethylene obtained from 2-chloroanthrone as the starting material according to U. S. Patent 1,709,956, Example 2, are dissolved. Then 6 parts of bromine are added by drops at 30° during about 10 minutes and stirred for 3 hours at this temperature. After pouring on ice, a somewhat greenish blue precipitate is obtained which is filtered by suction and washed with water and hot alcohol. The product is a dark-blue powder which dissolves in concentrated sulfuric acid with a brown-olive color, in a hydrosulfite vat with a grass-green color. By recrystallizing from o-dichlorobenzene (boiling for an appreciable span of time is to be avoided) the product may be obtained from a dark-blue solution in the form of dark-blue crystal needles. On analysis, it becomes evident that besides the two chlorine atoms already present another two bromine atoms have entered the molecule.

The same substance is obtained in very good yields, when sulfurmonochloride is used as a catalyst instead of iodine. Also without the use of a catalyst the substance is formed, but in lower yields and an isolation by fractional crystallization is more difficult.

When the blue substance is heated in nitrobenzene, quinoline or concentrated sulfuric acid, a dyestuff of the acedianthrone series is obtained.

When in this example the 2.2'-dichlorodianthrone-ethylene is replaced by the tetrachlorodianthrone-ethylene obtainable from 2.6-dichloroanthrone, a blue product is obtained, which contains 4 chlorine and 2 bromine atoms according to its analysis.

*Example 3*

In a mixture of 20 parts of sulfuric acid monohydrate and 60 parts of chlorosulfonic acid, 5 parts of the starting material used in Example 2 are stirred with 0.5 part of iodine and 6 parts of bromine at 30° for about 3 hours. After pouring on ice the product is obtained as a greenish blue precipitation. The vat has an olive green color. By boiling with alcohol and recrystallizing from monochlorobenzene the product may be further purified, and then corresponds in its properties to the substance obtained according to Example 2.

I claim:

1. Process which comprises acting with bromine in a strong acid of the group consisting of chlorosulfonic acid and sulfuric acid mono-hydrate on a dianthrone ethylene compound of the formula

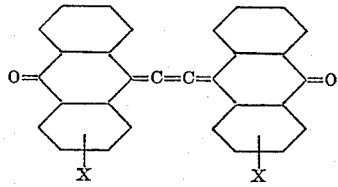

(wherein the X's represent substituents of the group consisting of hydrogen, methyl and chlorine).

2. The reaction products of bromine in a strong acid of the group consisting of chlorosulfonic acid and sulfuric acid mono-hydrate on a dianthrone ethylene compound of the formula

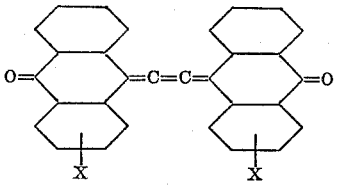

(wherein the X's represent substituents of the group consisting of hydrogen, methyl and chlorine).

3. The reaction product of bromine in a strong acid of the group consisting of chlorosulfonic acid and sulfuric acid mono-hydrate on dianthrone ethylene of the formula

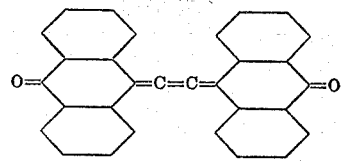

which product contains 4 molecular proportions of bromine.

4. The reaction product of bromine in a strong acid of the group consisting of chlorosulfonic acid and sulfuric acid mono-hydrate on dichlorodianthrone-ethylene of the formula

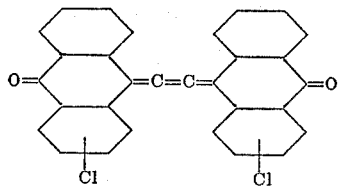

which product contains 2 molecular proportions of bromine.

References Cited in the file of this patent
UNITED STATES PATENTS

| | | |
|---|---|---|
| 1,709,956 | Scheyer | Apr. 23, 1929 |
| 1,990,841 | Scheyer | Feb. 12, 1935 |
| 2,042,683 | Scheyer et al. | June 2, 1936 |
| 2,559,596 | Coffey et al. | July 10, 1951 |
| 2,645,634 | Schwamberger | July 14, 1953 |